Jan. 18, 1955  J. K. DOUGLAS  2,699,651
HYDRAULIC DRIVE FOR PLANERS AND THE LIKE
Filed Aug. 24, 1953  5 Sheets-Sheet 1

INVENTOR
JAMES K. DOUGLAS
BY
Wesley A. Morich
ATTORNEY

Jan. 18, 1955  J. K. DOUGLAS  2,699,651
HYDRAULIC DRIVE FOR PLANERS AND THE LIKE
Filed Aug. 24, 1953  5 Sheets-Sheet 2

INVENTOR
JAMES K. DOUGLAS
BY
ATTORNEY

Jan. 18, 1955  J. K. DOUGLAS  2,699,651
HYDRAULIC DRIVE FOR PLANERS AND THE LIKE
Filed Aug. 24, 1953  5 Sheets-Sheet 3

INVENTOR
JAMES K. DOUGLAS
BY
Wesley P. Merrill
ATTORNEY

Jan. 18, 1955   J. K. DOUGLAS   2,699,651
HYDRAULIC DRIVE FOR PLANERS AND THE LIKE
Filed Aug. 24, 1953   5 Sheets-Sheet 4

INVENTOR
JAMES K. DOUGLAS
BY
ATTORNEY

INVENTOR
JAMES K. DOUGLAS
BY
Wesley P. Merrill
ATTORNEY

United States Patent Office 2,699,651
Patented Jan. 18, 1955

2,699,651

HYDRAULIC DRIVE FOR PLANERS AND THE LIKE

James K. Douglas, Shorewood, Wis., assignor to The Oilgear Company, Milwaukee, Wis., a corporation of Wisconsin Application August 24, 1953, Serial No. 376,038

22 Claims. (Cl. 60—52)

This invention relates to hydraulic drivers of the type employed to drive a machine part or other element through predetermined linear or angular distances in opposite directions alternately, such as the drive shown in Patent No. 2,465,212.

A drive constructed according to the invention is particularly adapted to drive the table of a bed planer and the invention will be explained as being employed for that purpose but it is to be understood that the invention is not limited to a planer drive and that drives embodying the invention may be employed to drive machine parts or other elements which are to be reciprocated or rotated in opposite directions alternately.

A hydraulic planer drive includes a hydraulic motor for driving the table of the planer, a pump for supplying liquid to the motor to energize it, means to control the rate and direction of flow of liquid to thereby control the speed and direction of table movement and means for reversing the flow of liquid to thereby reverse the direction of table movement. In order to keep control of the planer table, the pump and motor ordinarily are connected into a closed circuit. That is, the pump and motor are connected in series so that all of the liquid discharged by the pump flows to the motor and all of the liquid discharged from the motor is returned to the pump.

When the planer is taking a heavy cut or is operating upon tough material, the table will vibrate longitudinally due to variations in tool resistance and to the elasticity of the motive liquid.

The present invention has as an object to provide a drive which will drive an element in opposite directions alternately and will reverse the element at substantially the same point each time regardless of its speed and in which table vibrations are reduced to a minimum.

Another object is to provide a drive which has all the advantages of the drive shown in Patent No. 2,465,212 and which is controlled electrically.

Another object is to provide a hydraulic drive which is very accurate in operation and is susceptible of close adjustment and control.

Other objects and advantages will appear from the following description of the hydraulic drive shown schematically in the accompanying drawings in which the views are as follows.

GENERAL ARRANGEMENT

For the purpose of illustration, the drive has been shown as being employed to reciprocate table 1 of a conventional planer. Since such a planer is well known and forms no part of the present invention, only the table thereof has been illustrated. Table 1 is reciprocated by a hydraulic motor which may be of the rotary type, as shown in Patent No. 2,465,212, or of the reciprocating type. A reciprocating hydraulic motor may comprise a single double acting cylinder or two opposed single acting cylinders, in which case the drive would have only a single range of speeds, or the drive may comprise a combination of double acting and single acting cylinders in which case the drive would have a plurality of speed ranges.

Figure 1:
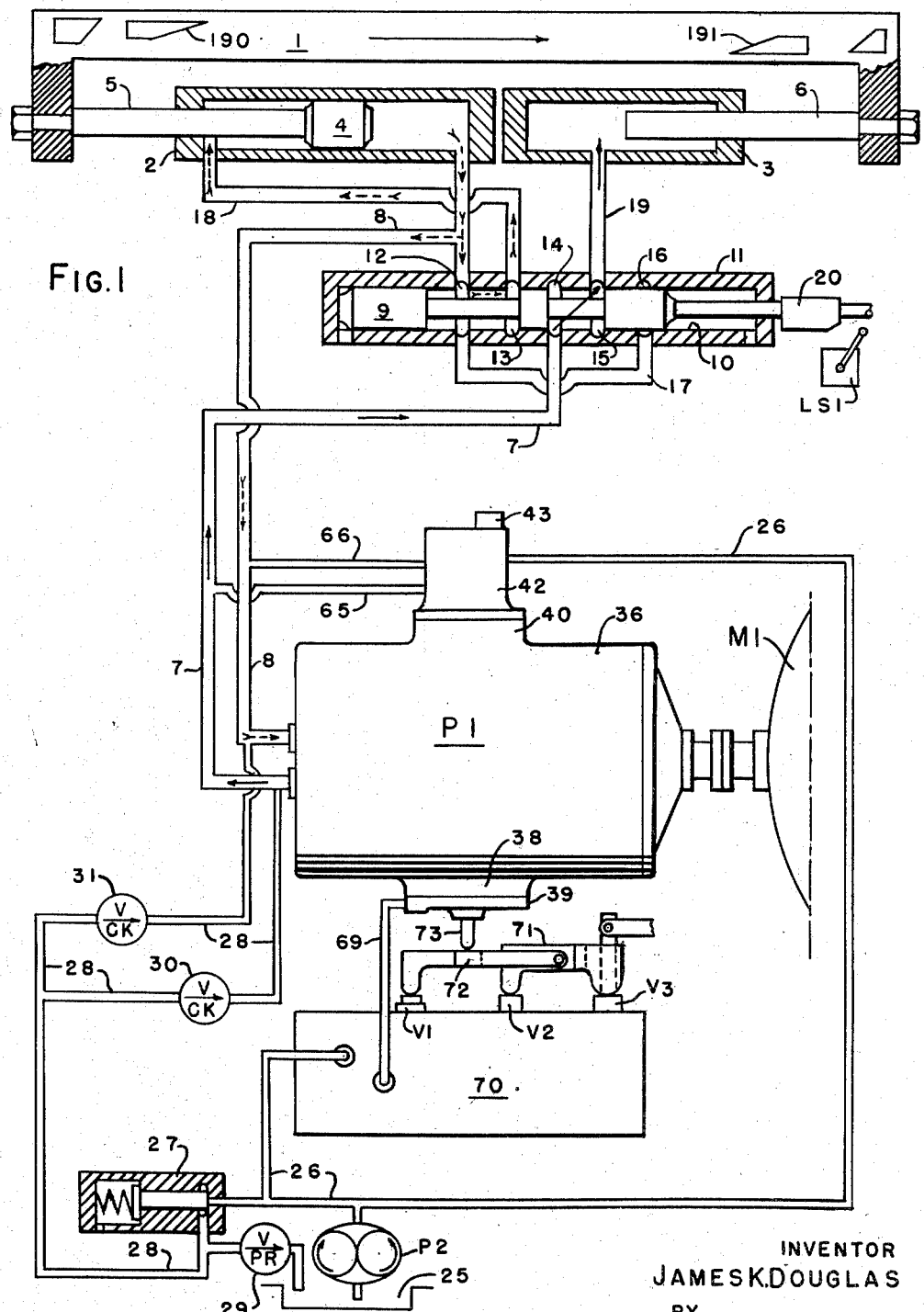
Fig. 1 is a diagram of the hydraulic circuit of a planar drive in which the invention is embodied.

In order to simplify the drawings, the hydraulic motor has been shown in Fig. 1 as having two stationary cylinders 2 and 3 arranged in axial alinement, a piston 4 fitted in cylinder 2 and connected by a rod 5 to the left end of table 1, and a ram 6 extending into cylinder 3 and connected to the right end of table 1. But in practice the cylinders are arranged alongside each other in order that the table may have a maximum stroke and three cylinders may be employed instead of two in order to avoid exerting transverse forces upon the table.

Liquid for energizing the hydraulic motor is supplied thereto by a reversible variable displacement pump P1 which is driven by an electric motor M1. Pump P1 when driven will deliver liquid to the motor and have liquid returned to it through one or the other of two channels 7 and 8 and thereby cause the motor to drive table 1 at a speed proportional to the displacement of pump P1.

Piston rod 5 and ram 6 have the same cross-sectional area so that, when pump P1 supplies motive liquid to the motor at a given rate, liquid will be returned to pump P1 from the motor at substantially the same rate. The cross-sectional area of rod 5 bears such a ratio to the cross-sectional area of piston 4 that three distinct speed ranges are available. For example, if the cross-sectional area of rod 5 is one-third that of piston 4, liquid delivered to cylinder 3 and to the left end of cylinder 2 at a given rate would cause the motor to move table 1 toward the right at a low speed, liquid delivered at the same rate to the left end of cylinder 2 only will cause the motor to move table 1 toward the right at an intermediate speed which is twice the low speed, and liquid delivered at the same rate to cylinder 3 only will cause the motor to move table 1 toward the right at a high speed which is three times the low speed.

In practice, the drive is provided with a system of valves which are hydraulically operated and electrically controlled and which enable the motor to advance the table on a cutting stroke at a selected speed in any one of the speed ranges and to retract the table at a selected speed in the high speed range. But in order to simplify the drawings, the drive has been shown provided with a selector valve 9 which is adjustable to enable the motor to advance table 1 at a selected speed within any one of three speed ranges and to retract table 1 at a selected speed within the same speed range.

As shown, selector valve 9 is fitted in a bore 10 which is formed in a valve body 11 and has five annular grooves or ports 12, 13, 14, 15 and 16 formed in its wall. Channel 7 is connected to port 14. Channel 8 is connected to the right end of cylinder 2 and to port 12 which is also connected by a channel 17 to port 16. Port 13 is connected to the left end of cylinder 2 by a channel 18 and port 15 is connected to cylinder 3 by a channel 19.

When valve 9 is in the position shown in Fig. 1 and pump P1 is discharging liquid into channel 7, liquid will flow from channel 7 through bore 10 and channel 19, as indicated by the full arrows, to cylinder 3 and act upon the end of ram 6, thereby causing ram 6 to move table 1 toward the right at a selected speed within the high speed range. Movement of table 1 toward the right will cause piston 4 to expel liquid from the right end of cylinder 2 into channel 8. The expelled liquid will flow in part through channel 8 to the intake of pump P1 and in part through bore 10 and channel 18 to the left end of cylinder 2 as indicated by the dotted arrows. Reversal of pump P1 will cause liquid to flow through the same paths but in the opposite direction. The liquid delivered to the right end of cylinder 2 will cause piston 4 to move table 1 toward the left at a selected speed within the high speed range.

Figure 2:
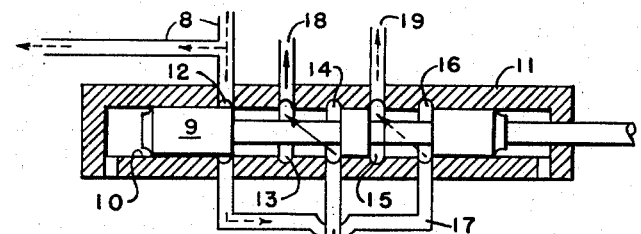
Figs. 2 and 3 are views showing a speed range selector valve in positions different from that shown in Fig. 1.

When valve 9 is in the position shown in Fig. 2 and pump P1 is discharging liquid into channel 7, liquid will flow from channel 7 through bore 10 and channel 18, as indicated by the full arrows, to the left end of cylinder 2 and act upon the left end of piston 4, thereby causing piston 4 to move table 1 toward the right at a selected speed within the intermediate speed range and to expel liquid from the right end of cylinder 2 into channel 8. The expelled liquid will flow in part through channel 8 to the intake of pump P1 and in part through port 12, channel 17, bore 10 and channel 19, as indicated by the dotted arrows, to cylinder 3 to keep it filled as ram 6 moves toward the right. Reversal of pump P1 will cause liquid to flow through the same paths but in opposite directions. The liquid delivered to the right end of cylinder 2 will cause piston 4 to move table 1 toward the left at a selected speed within the intermediate speed range.

Figure 3:
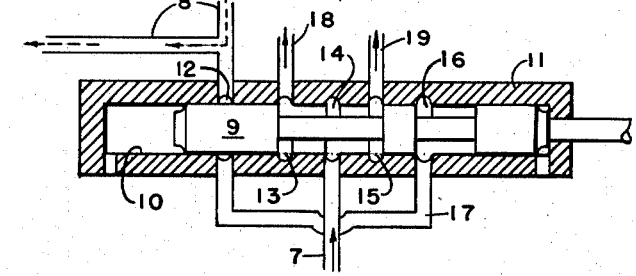

When valve 9 is in the position shown in Fig. 3 and pump P1 is discharging liquid into channel 7, liquid will flow from channel 7 through bore 10 and channels 18 and 19, as indicated by the full arrows, to cylinder 3 and to the left end of cylinder 2. The liquid entering cylinder 2 will act upon the left end of piston 4 and the liquid entering cylinder 3 will act upon the end of ram 6, thereby causing piston 4 and ram 6 to move table 1 toward the right at a selected speed within the low speed range. Movement of table 1 toward the right will cause piston 4 to dispel liquid from the right end of cylinder 2 through channel 8, as indicated by the dotted arrows, to the intake of pump P1. Reversal of pump P1 will cause liquid to flow through the same path but in the opposite direction. The liquid delivered to the right end of cylinder 2 will cause piston 4 to move table 1 toward the left at a selected speed within the low speed range.

Table 1 must be accelerated at the beginning of each stroke in each direction and must be decelerated near the end of each stroke in each direction. Table 1 is accelerated and decelerated by means to be presently described. The rate at which the table should be accelerated or decelerated when the drive is operating in the high speed range is different from the rate at which the table should be accelerated or decelerated when the drive is operating in the intermediate range or the low speed range. As will presently be explained, selection between those rates is accomplished by means including a limit switch LS1 which is open when the drive is operating in the high speed range and is closed when the drive is operating in a lower speed range. As shown, switch LS1 is operated by a cam 20 fixed upon the stem of valve 9 in such a position that it will close switch LS1 when valve 9 is shifted from the position shown in Fig. 1 into the position shown in Fig. 2 or into the position shown in Fig. 3.

Except for its controls, pump P1 is a standard commercial type of pump which is mounted upon a base (not shown) and which has an auxiliary pump driven in unison therewith and arranged in the casing thereof. However, the auxiliary pump P2 has been shown in Fig. 1 outside of the casing of pump P1 in order to illustrate the auxiliary pump circuit.

Pump P2 draws liquid from a reservoir 25, which is in the base of pump P1, and discharges it into a branched control channel 26 having one of its branches connected to the inlet of a relief valve 27 the outlet of which is connected to a branched channel 28 having one branch thereof connected to a low pressure relief valve 29 which discharges into reservoir 25. A second branch of channel 28 is connected to channel 7 and has a check valve 30 connected therein. A third branch of channel 28 is connected to channel 8 and has a check valve 31 connected therein. Relief valves 27 and 29, channel 28 and check valves 30 and 31 are arranged within the base and casing of pump P1 and do not appear in Fig. 4.

When pump P2 is running, it discharges liquid continuously through relief valves 27 and 29 into reservoir 25. Relief valve 27 enables pump P2 to maintain a suitable control pressure in channel 26 and relief valve 29 enables pump P2 to maintain a low pressure in channel 28. Check valves 30 and 31 prevent liquid from flowing from channels 7 and 8 into channel 28 but permit liquid to flow from channel 28 into either channel 7 or channel 8 whenever the pressure in that channel is lower than the pressure in channel 28, thereby keeping the main hydraulic circuit completely filled with liquid.

In practice, liquid for energizing certain auxiliary motors (not shown) which operate the cross feed, rail clamp and tool lifter of the planer and for operating the speed range selector valving is supplied by a third pump which also maintains a back pressure on the hydraulic motor during the cutting stroke of table 1 and which has a relief valve for limiting the back pressure. Since the auxiliary motors and hydraulic operation of the speed range selector valving forms no part of the present invention, the third pump has not been illustrated and the drive has been shown as having the back pressure on the motor supplied by pump P2, as will presently be explained, but it is to be understood that the use of a third pump is preferable in order that pump P2 may be small and the back pressure be considerably higher than the control pressure.

THE MAIN PUMP

Since pump P1 is a standard commercial type, it is deemed sufficient to state herein that it has a pumping mechanism arranged within a displacement varying member or slideblock 35 (Fig. 4) which is arranged within the casing 36 of the pump, that pump displacement will be zero when slideblock 35 is in its central or neutral position and that the pump will deliver liquid in a direction and at a rate dependent upon the direction and distance that slideblock 35 is shifted from its neutral position. More specifically, pump P1 will discharge liquid into channel 7 and have liquid returned to it through channel 8 when slideblock 35 is moved from its neutral position downward in respect to Fig. 4 and it will discharge liquid into channel 8 and have liquid returned to its through channel 7 when slideblock 35 is moved from its neutral position upward in respect to Fig. 4.

Figure 4:
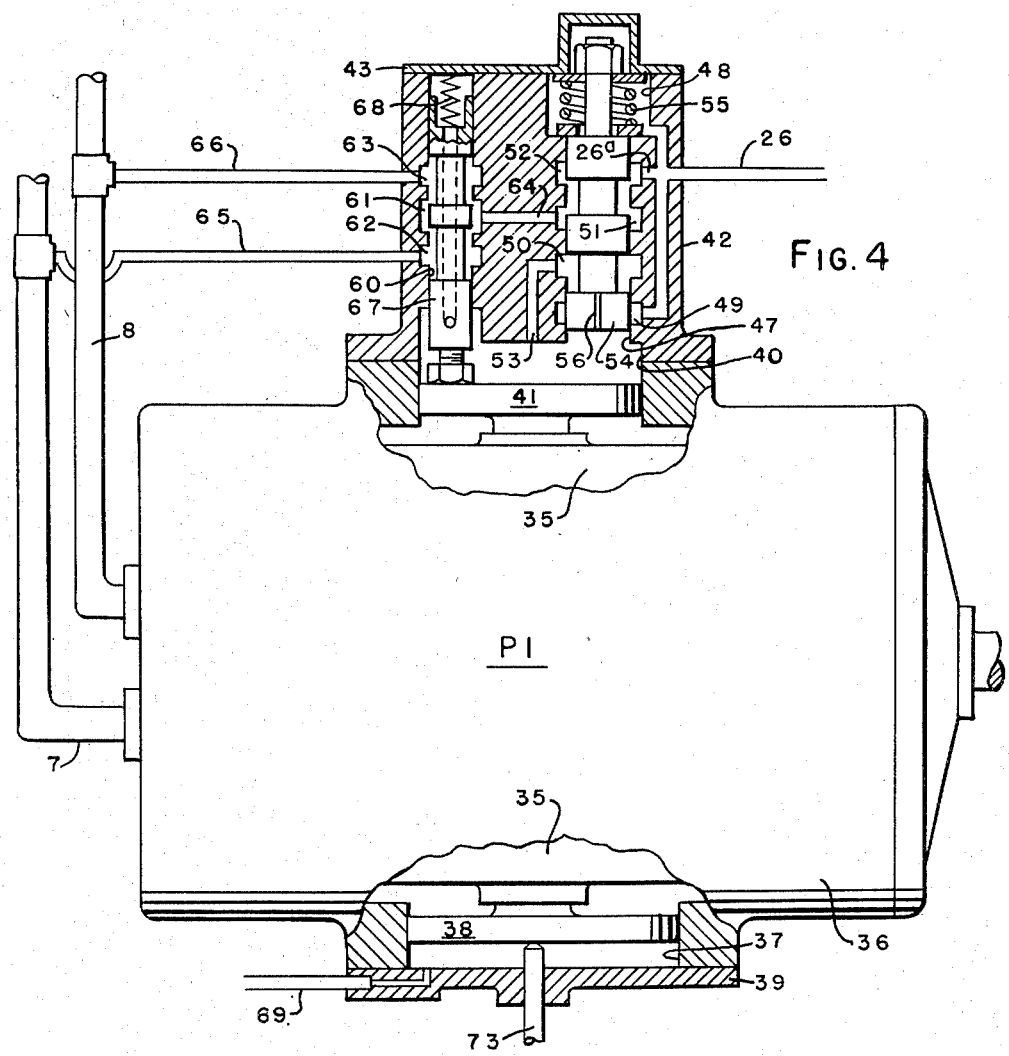
Fig. 4 is an enlarged view illustrating the displacement varying mechanism of the pump shown in Fig. 1.

Movement of slideblock 35 upward in respect to Fig. 4 is effected by a servo-motor comprising a cylinder 37, which is arranged in the wall of casing 36 at one side of slideblock 35, and a piston 38 which is fitted in cylinder 37 and engages slideblock 35. Cylinder 37 is closed at its outer end by an end head 39. Movement of slideblock 35 downward in respect to Fig. 4 is effected by a servo-motor comprising a cylinder 40, which is arranged in the wall of casing 36 at the other side of slideblock 35, and a piston 41 which is fitted in cylinder 40 and engages slideblock 35. Cylinder 40 is closed at its outer end by a valve body 42 having a cap 43 on its outer end.

Servo-motors 37—38 and 40—41 are both operated by liquid supplied thereto from pump P2 at the same pressure but piston 38 is considerably larger than piston 41 so that, when both of cylinders 37 and 40 are connected to pump P2, liquid will flow into cylinder 37 and cause piston 38 to move slideblock 35 upward in respect to Fig. 4 against the resistance of piston 41 and, when cylinder 40 is connected to pump P2 and cylinder 37 is connected to exhaust, liquid will flow into cylinder 40 and cause piston 41 to move slideback 35 in the opposite direction. Liquid for operating servo-motor 40—41 is continuously available thereto from pump P2 but the flow of liquid into and out of cylinder 37 is controlled by a pilot valve and the rate at which liquid can flow into or out of cylinder 37 is regulated to thereby cause slideblock 35 to be moved at a regulated rate as will presently be explained.

LOCKING OF MAIN CIRCUIT

Valve body 42 has formed therein a valve bore 47 which communicates at one end with a cylinder 40 and at its other end with a spring chamber 48 the outer end of which is closed by cap 43. Bore 47 has formed in the wall thereof four annular grooves or ports 49, 50, 51 and 52. Port 50 is connected to cylinder 40 by a channel 53. Port 49 and spring chamber 48 have a branch of control channel 26 connected thereto. Port 52 has connected thereto a back pressure channel 126ᵃ which has been shown as being a branch of channel 26 but in practice the back pressure channel is connected to the third pump previously mentioned and it communicates with the relief valve of that pump.

Communication between the several ports 49—52 is controlled by a locking valve 54 which is fitted in bore 47 and is spring centered in the position shown in Fig. 4 by a caged spring 55 arranged in spring chamber 48. Valve 54 moves with piston 41 as will presently be explained. In order to permit valve 54 to be spring centered, the piston thereof which normally covers port 49 is provided in its peripheral surface with a small axial bleed groove 56.

The function of locking valve 54 is to unlock the main hydraulic circuit by establishing communication between the return side of the main hydraulic circuit and the back pressure channel when the hydraulic motor is driving table 1 at a cutting speed in the cutting direction and to lock the main hydraulic circuit, that is to block communication between the main hydraulic circuit and the back pressure channel when table 1 is being accelerated or decelerated.

Valve body 42 also has formed therein a valve bore 60 having three annular grooves or ports 61, 62 and 63 formed in the wall thereof. Port 61 is connected by a channel 64 to port 51. Ports 62 and 63 are connected, respectively, by channels 65 and 66 to channels 7 and 8 respectively. Communication between ports 61, 62 and 63 is controlled by a selector valve 67 which is fitted in bore 60 which is held in engagement with piston 41 by a spring 68 which is arranged in the outer end of bore 60 and reacts against cap 43.

The function of valve 67 is to determine the side of the main hydraulic circuit into which back pressure can extend when slideblock 35 is offset from its neutral position and to permit bypass of liquid between channels 7 and 8 when slideblock 35 is in its neutral position. If the planar is to cut in either or both directions, valve 67 is made substantially as shown so it will not block either of ports 62 and 63 but if the planer is to cut in one direction only, valve 67 may have the innermost piston thereof made of such a length that it will extend into port 62 when valve 67 is in its neutral position and will block port 62 when valve 67 is moved a very short distance upward in respect to Fig. 4.

The arrangement is such that, when slideblock 35 and valves 54 and 67 are in their neutral positions as shown in Fig. 4, port 51 is open to port 52 and there is a slight opening between port 61 and each of ports 62 and 63 so that the pressure in port 52 can extend through port 51 and channel 64 into port 61 and extend therefrom through port 62 and channel 65 into channel 7 and through port 63 and channel 66 into channel 8. If slideblock 35 should wander slightly from its neutral position, any liquid discharged by pump P1 into channel 7 or 8 would be bypassed through channels 65 and 66, ports 62 and 63 and bore 60 but slideblock 35 would immediately be brought back to its neutral position by a control to be presently described.

When liquid is supplied to cylinder 37, piston 38 will move slideblock 35 and piston 41 upward in respect to Fig. 4 and cause pump P1 to discharge liquid into channel 8 immediately after slideblock 35 moved beyond its neutral position. Valve 67 will move with piston 41 and only a slight movement thereof beyond its neutral position is required to cause it to block communication between ports 62 and 63, thereby closing the bypass between channels 7 and 8 and also blocking communication between channel 26ᵃ and channel 8.

Movement of piston 41 will cause it to expel liquid from cylinder 40. The expelled liquid will first move valve 54 against the resistance of spring 55 and cause it to expel liquid from spring chamber 48 into channel 26 until valve 54 uncovers port 49 and then piston 41 will expel liquid from cylinder 40 through port 49 into channel 26. Since the cross-sectional area of piston 41 is several times that of valve 54, a slight movement of piston 41 will result in a substantial movement of piston 54 so that port 49 is uncovered very quickly. Also, movement of valve 54 away from its neutral position causes it to block port 51 and thereby block communication between channel 26ᵃ and channels 7 and 8.

As soon as slideblock 35 ceases to move, spring 55 will be able to return valve 54 to its neutral position because the same pressure prevails at both ends of the valve. The return movement of valve 54 causes it to eject liquid from the inner end of bore 47 and the ejected liquid will flow directly through port 49 into channel 26 until valve 54 blocks port 49 and then the ejected liquid will flow through groove 56 and port 49 into channel 26.

When slideblock 35 is in its neutral position and cylinder 37 is connected to exhaust, the control pressure in cylinder 40 will cause piston 41 to move slideblock 35 downward in respect to Fig. 4 and liquid will flow into spring chamber 48 and cause valve 54 to move toward cylinder 40 and maintain the pressure therein until valve 54 partly uncovers port 49 and then liquid will flow from channel 26 through ports 49 and 50 and channel 53 in cylinder 40 and keep piston 41 and slideblock 35 moving until the escape of liquid from cylinder 37 ceases. Movement of valve 54 away from its neutral position causes it to block port 52 and thereby block communication between channel 26ᵃ and channels 7 and 8.

Movement of slideblock 35 downward in respect to Fig. 4 will cause pump P1 to discharge liquid into channel 7 and, with valve 9 in the position shown in Fig. 1, the liquid discharged by pump P1 will flow to cylinder 3 and cause ram 6 to move table 1 toward the right on a cutting stroke. Spring 68 will cause valve 67 to move with piston 41 and to block communication between ports 61 and 62 so that no liquid can escape from channel 7 into channel 65.

The rate at which pump P1 discharges liquid will gradually increase from zero as slideblock 35 moves away from its neutral position, thereby causing motor 2—6 to gradually accelerate table 1 until movement of slideblock 35 ceases at which time table 1 will be moving at a predetermined cutting speed.

During acceleration of table 1, valve 54 will keep the main circuits locked by blocking port 52 so that all liquid discharged by motor 2—6 must be returned to pump P1 and the only back pressure on motor 2—6 is the supercharge pressure which is determined by the adjustment of relief valve 29. But as soon as movement of slideblock 35 ceases, valve 54 will be returned to its neutral position by spring 55 and will permit the back pressure in channel 26 to extend into motor 2—6. Movement of valve 54 toward its neutral position will cause liquid to flow from channel 26 through ports 49 and 50 and channel 53 into cylinder 40 until valve 54 covers port 49 and then to flow through port 49 and groove 56 into cylinder 40 to maintain the control pressure therein.

At about the time that table 1 reaches cutting speed, a stationary tool starts to take a cut from work fastened to table 1 and pump P1 must create in the pressure side of the circuit a pressure which exceeds the back pressure by an amount sufficient to enable motor 2—6 to overcome the friction of table 1 and the resistance of the work to the action of the tool thereon, thereby causing the liquid in the pressure side of the circuit to be compressed. However, the tool resistance will vary due to variations in the thickness and hardness of the work.

Whenever there is a sudden and considerable decrease in tool resistance, such as when the tool breaks out of the work during one part of a cut, the compressed liquid in the pressure side of the circuit will expand and cause the table to jump forward which will cause the pressure in the pressure side of the circuit to drop momentarily. If at that time the circuit were locked or completely closed, the forward jump of the table would cause the liquid in the return side of the circuit to be compressed and at the end of the jump the compressed liquid in the return side of the circuit would expand and cause the table to chatter. But by having the circuit unlocked as explained above, the forward jump of the table will cause a small volume of liquid to be expelled through the back pressure relief valve which has been indicated in Fig. 1 as being valve 27 but which in practice is the relief valve of the third pump. By maintaining a relative high back pressure on the motor and providing a back pressure relief valve, the effect of variations in tool resistance is minimized and exceptionally smooth operation of the planer is obtained.

Shortly before table 1 reaches the end of a cutting stroke, liquid is supplied to cylinder 37 at a regulated rate and causes piston 38 to move slideblock 35 upward in respect to Fig. 4 to decrease the displacement of pump P1 and thereby decelerate table 1. If the circuit were unlocked at that time, the inertia of the table would cause it to overrun and to expel liquid through the back pressure relief valve but, as soon as slideblock 35 starts to move from its preset position, piston 41 will eject liquid from cylinder 40 which will cause valve 54 to move in the same direction and to block port 51, as previously explained, thereby locking the circuit so that the speed of table 1 is determined by the rate at which the liquid expelled from motor 2—6 can enter pump P1 with the result that table 1 is decelerated at a rate proportional to the rate at which the displacement of pump P1 is reduced.

Slideblock 35 will continue to move and, as soon as it passes beyond its neutral position, pump P1 will discharge liquid into channel 8 which will cause motor 2—6 to move able 1 toward the left on a return stroke. Pump P1 will discharge liquid into channel 8 at a gradually increasing rate and cause motor 2—6 to gradually accelerate table 1 until slideblock 35 reaches a selected position at which time table 1 will be moving at a predetermined return speed and spring 55 will return valve 54 to its neutral position.

Shortly before table 1 reaches the end of the return stroke, cylinder 38 is connected to exhaust and the liquid supplied to cylinder 40 will shift valve 54 to lock the circuit and will cause piston 41 to move slideblock 35 downward in respect to Fig. 4 to thereby first decelerate table 1 to zero speed and then accelerate it to a cutting speed as explained above. Table 1 will continue to reciprocate in the above described manner until stopped by the operator.

Valve 54 thus automatically locks the circuit at the beginning of each deceleration of table 1 with the result that the reversal of table 1 at each end of its stroke takes place each time at the same point regardless of how fast the table is moving during the cutting and return strokes.

CONTROL FOR MAIN PUMP

Liquid flows to and from cylinder 37 through a channel 69 which connects cylinder 37 to a valve block 70 containing a valve mechanism which controls the operation of pump P1. The several parts of the valve mechanism are arranged close together and the valve plungers are alongside each other within block 70 but, in order to illustrate the relation between the parts and to clearly show the paths through which liquid flows within block 70, the parts have been spaced apart in Fig. 5 and the plungers shown in the positions occupied when the slideblock 35 is in its neutral position and the pumps are running.

The flow of liquid to and from cylinder 37 is controlled by a pilot valve plunger V1 which is moved away from a neutral position in response to movement of one or both of two plungers V2 and V3 and is moved toward the neutral position in response to movement of slideblock 35. Plunger V1 is moved or permitted to be moved by a follow-up mechanism shown as including a teeter bar 71, which has its ends pivoted upon upper ends of plungers V2 and V3, and a floating lever 72 which has one of its ends pivoted upon the upper end of plunger V1 and its other end pivoted to bar 71 intermediate the ends thereof.

In order to simplify the drawing, floating lever 72 has been shown as being engaged intermediate its ends by one end of a rod 73 the other end of which engages piston 38 but in practice slideblock 35 is arranged horizontally, plungers V1, V2 and V3 are arranged vertically and lever 72 is engaged intermediate its ends by one end of a suitable linkage the other end of which is fixed to or engages slideblock 35 at a point remote from cylinder 37.

Pilot valve plunger V1 has three spaced apart heads or pistons 74, 75 and 76 formed thereon and fitted in a bore 77 which is formed in valve block 70 and has formed in the wall thereof an annular groove or port 78 to which channel 69 is connected. Piston 75 controls communication between port 78 and a branch of channel 26, which communicates with bore 77 above piston 75, and between port 78 and an exhaust 79 which communicates with bore 77 below piston 75. When plunger V1 is in its neutral position, port 78 is covered by piston 75 which has been shown as being of the same width as port 78 but it may be wider than port 78 and have slots formed in its edges according to common practice. A small diameter bore 80 extends from the lower end of plunger V1 upward beyond piston 75 and then extends radially outward into communication with bore 77. A plunger 81 is fitted in bore 80 and reacts against the lower end wall of bore 70.

The arrangement is such that the control pressure extends from channel 26 into bore 80 and urges plunger V1 upward against the left end of lever 72 and thereby causes lever 72 to hold rod 73 against piston 38. When the right end of lever 72 is raised due to upward movement of one or both of plungers V2 and V3, lever 72 will pivot upon rod 73 and move plunger V1 downward. Then liquid will flow from channel 26 through bore 77, port 78 and channel 69 to cylinder 37 and cause piston 38 to move slideback 35 upward in respect to the drawing. The pressure in bore 80 will tend to move plunger V1 upward as fast as lever 72 tends to move it downward with the result that plunger V1 is returned to neutral and stops further movement of slideblock 35 substantially as soon as movement of the right end of lever 72 ceases.

When one or both of plungers V2 and V3 are moved downward, lever 72 will pivot upon rod 73 and permit the pressure in bore 80 to move plunger V1 upward to connect port 78 to exhaust port 79, thereby reducing the pressure in cylinder 37 and permitting servo-motor 40—41 to move slideblock 35 downward in respect to the drawing as previously explained. Piston 38 will eject liquid from cylinder 37 through channel 69, bore 70 and port 79 to exhaust. Rod 73 will move with slideblock 35 and will tend to move the left end of lever 72 downward as fast as the right end thereof moves downward so that plunger V1 is returned to its neutral position and stops further movement of slideblock 35 substantially as soon as movement of the right end of lever 72 ceases.

Plungers V1, V2 and V3 are urged upward hydraulically and, in order that they may exert only small forces upon the follow-up mechanism, the control pressure acts upon only a small area of plunger V1 and liquid for urging plungers V2 and V3 is supplied thereto at a low value such as 40 p. s. i.

As shown, a pressure reducing valve V4 having three spaced apart heads or pistons 84, 85 and 86 is fitted in a bore 87 which is formed in valve block 70 and has an annular groove or port 88 formed in its wall and connected to a branched supply channel 89. Piston 85 controls communication between port 88 and a branch of control channel 26, which communicates with bore 87 above port 88, and between port 88 and an exhaust port 90 which communicates with bore 87 at a point below port 88. Valve V4 is urged downward by a spring 91 and it is urged upward by liquid supplied to the lower end of bore 87 from port 88 through a passage 92 which extends radially into piston 85 and then extends downward through the lower end of valve V4.

The arrangement is such that spring 91 will initially hold valve V4 against the lower end wall of bore 87 but, as soon as pump P2 is started, liquid will flow through channel 26, bore 87 and passage 92 into the lower end of bore 87 and will raise valve V4 against the resistance of spring 91. If too great a pressure has been created in channel 89 before valve V4 closes port 88, liquid will flow through passage 92 to the lower end of bore 87 and will raise valve V4 until enough liquid has escaped from channel 89 to drop the pressure in channel 89 to the pressure determined by the resistance of spring 91. Thereafter, variations in the flow of liquid through channel 89 will cause valve V4 to move downward and upward alternately and thereby maintain the pressure in channel 89 at a substantially constant value.

The direction in which table 1 will move when started from a stationary position is determined by a directional valve V5 having three spaced apart heads or pistons 95, 96 and 97 formed thereon and fitted in a bore 98 which is formed in valve block 70 and communicates at its opposite ends with two spring chambers 99 and 100 of greater diameter. Valve V5 is spring centered by two springs 101 and 102 and two spring retainers 103 and 104. Spring 101 normally holds spring retainer 103 against the end of spring chamber 99 and against the outer face of piston 95, and spring 102 normally holds spring retainer 104 against the end of spring chamber 100 and against the outer face of piston 97.

Piston 96 controls communication between an annular groove or port 105, which is formed in the wall of bore 98 and has a channel 106 connected thereto, and supply channel 89 to a branch of which communicates with bore 98 at a point between pistons 95 and 96. Piston 96 also controls communication between port 105 and a passage 107 which extends radially into valve V4 between pistons 96 and 97 and then extends axially downward through the lower end of valve V4 so that the space between pistons 96 and 97 is open at all times to spring chamber 100 which is open to exhaust such as by means of a port 108 formed in the lower wall of chamber 100.

Movement of valve V5 in one direction or the other is effected by one or the other of two solenoids 109 and 110 shown as being connected to opposite ends of a lever 111 which is pivoted intermediate its ends upon a stationary bracket 112 and has one of its ends connected to the stem of valve V5.

The arrangement is such that solenoid 109 when energized will move valve V5 downward and then liquid can flow from channel 89 through bore 98 and port 105 into channel 106 and, when solenoid 109 is deenergized and solenoid 110 is energized, valve V5 will be moved upward and permit liquid to escape from channel 106 through port 105, bore 98, passage 107, spring chamber 100 and port 108 to exhaust.

The other end of channel 106 communicates with an annular groove or port 117 formed in the wall of a bore 118 which is formed in valve block 70 and has a second annular groove or port 119 formed in its wall and connected with one end of a channel 120. Port 117 also communicates with one end of a channel 121 having a choke 122 connected therein, and a third channel 123 having a choke 124 connected therein communicates with bore 118 between ports 117 and 119. Communication between channel 123 and ports 117 and 119 is controlled by a slow speed valve V6 which is fitted in bore 118. Valve V6 is urged into its upper position by a spring 125 and is adapted to be moved into its lower position by a solenoid 126. Movement of valve V6 into its lower position will cause slow speed plunger V2 to move in one direction or the other in response to valve V5 being moved in one direction or the other.

Slow speed plunger V2 has three spaced apart heads or pistons 130, 131 and 132 formed thereon and closely fitted in a bore 133 which is formed in valve block 70. Piston 131 normally covers an annular groove or port 134 which is formed in the wall of bore 133 and has channel 120 connected thereto. Two branches of supply channel 89 communicate with bore 133 at opposite sides of piston 30, channel 123 communicates with bore 133 below piston 132, and an axhaust port 135 communicates with bore 133 between pistons 131 and 132. Piston 131 is so constructed, such as being the same width as port 134, that a slight movement thereof will uncover a portion of port 134.

The arrangement is such that, when the displacement of pump P1 is zero and pump P2 is running, the pressure in the upper end of bore 133 tends to move plunger V2 downward but it cannot do so because liquid is trapped in the lower end of bore 133 by valve V6. If liquid should escape from the lower end of bore 133 and permit plunger V2 to move downward, piston 131 would uncover a portion of port 134 and permit liquid to flow from channel 89 through bore 133, port 134, channel 120, bore 118 and channel 123 to the lower end of bore 133 and move plunger V2 upward until piston 131 closed port 134 which would stop further upward movement of plunger V2.

Reversing plunger V3 has two spaced apart heads or pistons 140 and 141 formed thereon and fitted in a bore 142 which is formed in valve block 70 and has a branch of supply channel 89 communicating with its upper end. Bore 142 has two annular grooves or ports 143 and 144 formed in the wall thereof and communicating, respectively, with two channels 145 and 146 through which liquid may flow to and from bore 142. Ports 143 and 144 are so located that the adjacent ends of pistons 140 and 141 aline with adjacent edges of ports 143 and 144 when plunger V3 is in its neutral position but the distance between the adjacent edges of pistons 140 and 141 may be very slightly greater than the distance between the adjacent edges of ports 143 and 144 in which case liquid will seep from one port to the other when plunger V3 is in its neutral position and there is pressure in one of the ports.

Plunger V3 has a passage 147 extending into it from its lower end and then extending radially outward between pistons 140 and 141 to permit flow of liquid between the lower end of bore 142 and one or the other of ports 143 and 144 when plunger V3 is shifted in one direction or the other from its neutral position. Passage 147 communicates at its upper end with a passage 148 which extends upward through plunger V3 and communicates with the upper end of bore 142 through a hole 149. The upper end of passage 148 is closed by a stem 150 which is threaded into the upper end of plunger V3 and extends upward through the bifurcated end of teeter bar 71. Passage 148 has arranged therein a check valve 151 which prevents flow of liquid from the upper end of bore 142 into the lower end thereof but permits flow of liquid from the lower end of bore 142 into the upper end thereof at the instant that plunger V3 substantially covers ports 143 and 144 during its downward movement.

It has previously been explained that movement of plunger V3 in one direction or the other will effect an increase or a decrease in the displacement of pump P1 and thereby accelerate or decelerate table 1. The rate at which table 1 is accelerated or decelerated is proportional to the rate at which plunger V3 is moved but the acceleration rate should not be the same when motor 2—6 is operating in the high speed range as when it is operating in the intermediate or the low speed range.

Selection between the rates at which plunger V3 may be moved is made by a valve V7 having three spaced apart heads or pistons 155, 156 and 157 formed thereon and fitted in a bore 158 which is formed in valve block 70 and has four annular grooves or ports 159, 160, 161 and 162 formed in its wall. Valve V7 is urged to its upper position by a spring 167 and it is adapted to be moved into its lower position by a solenoid 168.

Ports 159 and 160 are connected through two chokes 163 and 164, respectively, to channel 145 and ports 161 and 162 are connected through two chokes 165 and 166, respectively, to channel 146. When selector valve 9 is adjusted to cause motor 2—6 to operate in the high speed range as shown, valve V7 is in its upper position and liquid may flow to and from plunger V3 through chokes 163 and 165 which regulate the rate at which plunger V3 will move away from its neutral position and thereby regulate the rate at which table 1 is accelerated at each end of its stroke. When valve 9 is adjusted to cause motor 2—6 to operate in either the intermediate or the low speed range, valve V7 will be shifted into its lower position and then liquid may flow to and from plunger V3 through chokes 164 and 166 which regulate the rate at which plunger V3 will move away from its neutral position and thereby regulate the rate at which table 1 is accelerated at each end of its stroke.

Channels 145 and 146 are adapted to be connected to pressure and to exhaust selectively under the control of a high speed valve V8 which is fitted in a bore 175 formed in valve block 70. Valve V8 is urged to its upper position by a spring 176 and it is adapted to be moved into its lower position by a solenoid 177.

Bore 175 has formed in the wall thereof an annular groove or port 178, to which supply channel 89 is connected, and two ports 179 and 180 which are arranged on opposite sides of port 178 and are connected to exhaust. In order to avoid complicating the view, no channels have been shown connected to ports 179 and 180 nor to the port 79 of pilot valve V1 so that those ports appear to exhaust to the atmosphere but in practice those ports exhaust into the liquid in a reservoir which is higher than those ports so that they are kept filled with liquid.

Bore 175 is connected at a point between ports 178 and 179 to bore 158 at a point between ports 159 and 160 by a channel 181 which is connected intermediate its ends to channel 145 by a channel 182 having arranged therein a check valve 183 which permits liquid to flow from channel 145 through channel 182 to channel 181 but prevents flow from channel 181 to channel 145 except through one or the other of chokes 163 and 164. Bore 175 is connectedat a point between ports 178 and 180 to bore 158 at a point between ports 161 and 162 by a channel 184 which is connected intermediate its ends to channel 146 by a channel 185 having arranged therein a check valve 186 which permits liquid to flow from channel 184 through channel 185 to channel 146 but prevents flow from channel 146 to channel 184 except through one or the other of chokes 165 and 166.

If when the drive is idle plunger V3 should move downward below its central or neutral position, pump P2 when started would cause liquid to flow through channel 89, past valve V8 and through channels 184, 185 and 186, port 144 and passage 147 into the lower end of bore 142 and raise plunger V3 until piston 141 covers port 144 which would stop further flow of liquid into the lower end of bore 142 and further upward movement of plunger V3. If plunger V3 should be raised above its central or neutral position, liquid will flow from channel 189 into the upper end of bore 142 and cause plunger V3 to move downward and to eject liquid from the lower end of bore 142 through passage 147, port 143 and channels 145, 182 and 181 and past valve 80 to exhaust until further downward movement of plunger V3 is stopped by piston 140 covering port 143 to stop further escape of liquid from the lower end of bore 142. Plunger V3 is thus self-centering when valve V8 is in its upper position.

In order to start table 1 moving from a stationary position plunger V3 is moved slightly off center hydraulically but, during normal operation of the drive, plunger V3 is moved slightly beyond center by an over-riding control which is operated by two dogs 190 and 191 fastened to table 1 in such positions that one or the other of the dogs engage the over-riding control as table 1 approaches the end of its stroke in either direction.

The over-riding control is quite complicated due to it also effecting operation of the auxiliary mechanism of the planer (not shown) and due to the relative locations of table 1 and valve block 70. Since no part of the invention resides in the over-riding control per se and in order to avoid complicating the view, the over-riding control has been represented by a simple device including a lever 192 which is pivoted intermediate its ends upon a stationary bracket 193 and has one of its ends bifurcated and pivoted to the stem 150 of plunger V3. The other end of lever 192 carries a roller 194 which is arranged in the paths of dogs 190 and 191 so that, when table 1 approaches the end of the stroke toward the right, dog 190 will depress roller 194 and cause lever 192 to raise plunger V3 and, when table 1 approaches the end of its stroke toward the left, dog 191 will raise roller 194 and cause lever 192 to depress plunger V3.

When table 1 is reciprocated, valve V8 is in its lower position and movement of plunger V3 beyond its central or neutral positions will cause it to be moved hydraulically to the limit of its movement in the same direction as will presently be explained.

From the foregoing, it will be obvious that movement of plunger V3 in one direction or the other will cause slideblock 35 of pump P1 to be moved in one direction or the other to vary pump displacement and that the distance that plunger V3 is moved away from its neutral position will determine the displacement of pump P1 and thereby determine the speed at which table 1 will be moved.

Upward movement of plunger V3 is limited by the upper end of stem 150 engaging a stop 195 shown as being an adjusting screw threaded in a stationary bracket 196. Adjustment of stop 195 determines the return speed of table 1. Downward movement of plunger V3 is limited by lever 192 engaging a suitable stop, such as a cam 197, which is fixed upon a shaft 198.

The angular position of cam 197 determined the cutting speed of table 1. When the widest part of cam 197 is upward, pump P1 can be adjusted to a minimum displacement and, when the narrowest part of cam 197 is upward, pump P1 can be adjusted to a maximum displacement.

Figure 10:
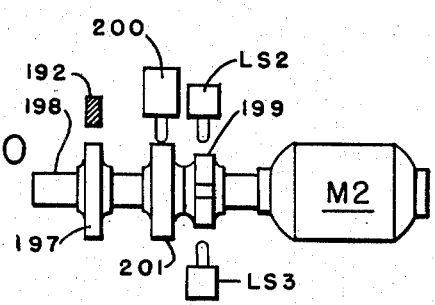
Fig. 10 is a view taken in the plane indicated by the line 10—10 of Fig. 5 but drawn to a larger scale.

Shaft 198 is connected to a geared capacitator motor M2 (Fig. 10) which is adapted to rotate shaft 198 and cam 197 in either direction selectively under the control of the operator. In order to prevent cam 197 from being rotated beyond either its maximum displacement position or its minimum displacement position, a cam 199 is fixed upon shaft 198 and two normally closed limit switches LS2 and LS3 are connected in series with motor M2 and are so located that switch LS2 will be opened by cam 199 in response to cam 197 approaching its maximum displacement position and switch LS3 will be opened by cam 199 in response to cam 197 approaching its minimum displacement position.

In order to indicate to the operator the speed at which table 1 will move on a cutting stroke, a gage graduated in feet per minute for each of the three speed ranges may be arranged at the operator's station and electric current for operating the gage may be supplied thereto through an electric pick-up 200 (Fig. 10) having the stem of its core in contact with a cam 201 which is fixed upon shaft 198 and has the same contour as cam 197. The flow of current through the pick-up will vary in response to movement of the pick-up core. Since the contour of cam 201 is the same as that of cam 197 and since the position of slideblock 35 and consequently the speed of table 1 is determined by the angular position of cam 197, the gage will indicate the speed of table 1. Since position indicating means of this type are well known and in commercial use, only the pick-up and the cam have been illustrated.

THE ELECTRIC CIRCUIT

Figure 7:
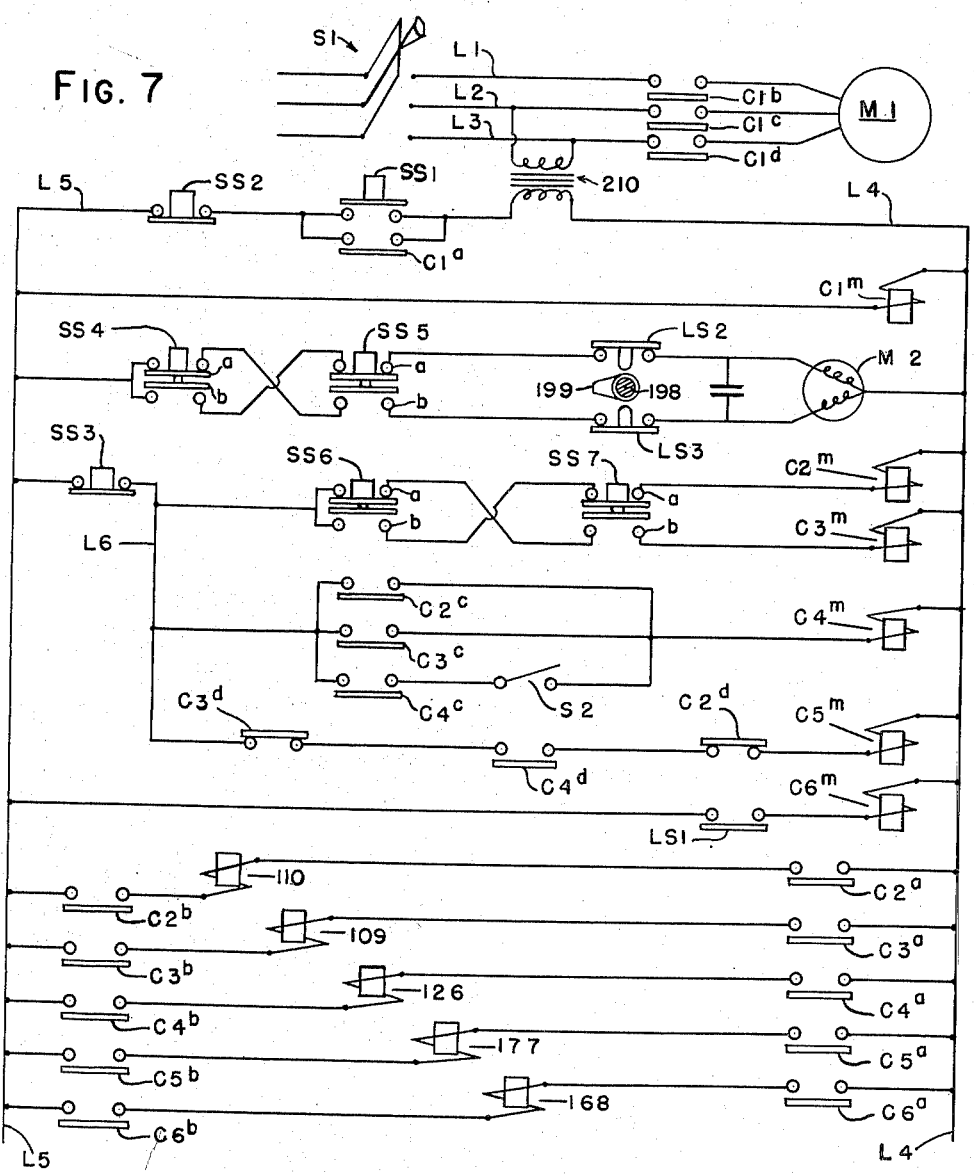
Fig. 7 is a diagram of an electric circuit for controlling the solenoids which operate the valves shown in Figs. 5 and 6.

As indicated in Fig. 7, electric current for energizing motor M1 is supplied from a power source through a line switch S1 to three power lines L1, L2 and L3. Preferably, motor M2 and solenoids 109, 110, 126, 168 and 177 are connected into a control circuit to which current is supplied at a voltage lower than the voltage in the power line.

As shown, current is supplied to the control circuit through a transformer 210 which has opposite ends of its primary connected to lines L2 and L3 respectively, one end of its secondary connected to one side L4 of a control circuit and the other end of its secondary connected to the second side L5 of the control circuit through a normally open starting switch SS1 and a normally closed stop switch SS2. In order that the planar table may be stopped without interfering with other functions of the control, the second side of the control circuit has a branch line L6 which is connected to line L5 through a normally closed stop switch SS3.

Figure 8:
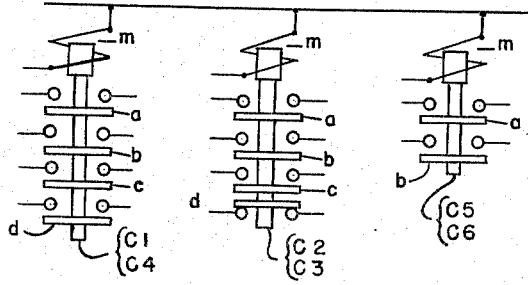
Fig. 8 is a schematic representation of the magnetic switches employed in the circuit shown in Fig. 7.

Motor M1 is controlled by a magnetic motor starter switch which, in order to avoid complicating the drawing, has been represented by a simple contactor C1. Solenoids 110, 109, 126, 177 and 168 are controlled by magnetic switches or contactors C2, C3, C4, C5 and C6 respectively. As indicated schematically in Fig. 8, motor starter C1 and contactor C4 each has four normally open switches $a$, $b$, $c$ and $d$ and a magnet $m$ for closing the switches. Each of the contactors C2 and C3 has three normally open switches $a$, $b$ and $c$, a normally closed switch $d$ and a magnet $m$ for operating the switches. Each of contactors C5 and C6 has two normally open switches $a$ and $b$ and a magnet $m$ for closing the switches.

Motor starter C1 has its magnet $C1^m$ connected between lines L4 and L5, its switch $C1^a$ connected in parallel with starting switch SS19, and its switches $C1^b$, $C1^c$ and $C1^d$ connected between motor M1 and lines L1, L2 and L3 respectively. When line switch S1 is closed, closing starting switch SS1 will cause current to flow in the control circuit to energize magnet $C1^m$ which will close the motor starter switches. Switch $C1^a$ will keep current flowing in the control circuit and thereby keep magnet C1 energized when switch SS1 is released. Switches $C1^b$, $C1^c$ and $C1^d$ will establish a circuit through motor M1 to energize it. Motor M1 will then continue to run until stop switch SS2 or line switch S1 is opened.

Figure 5:
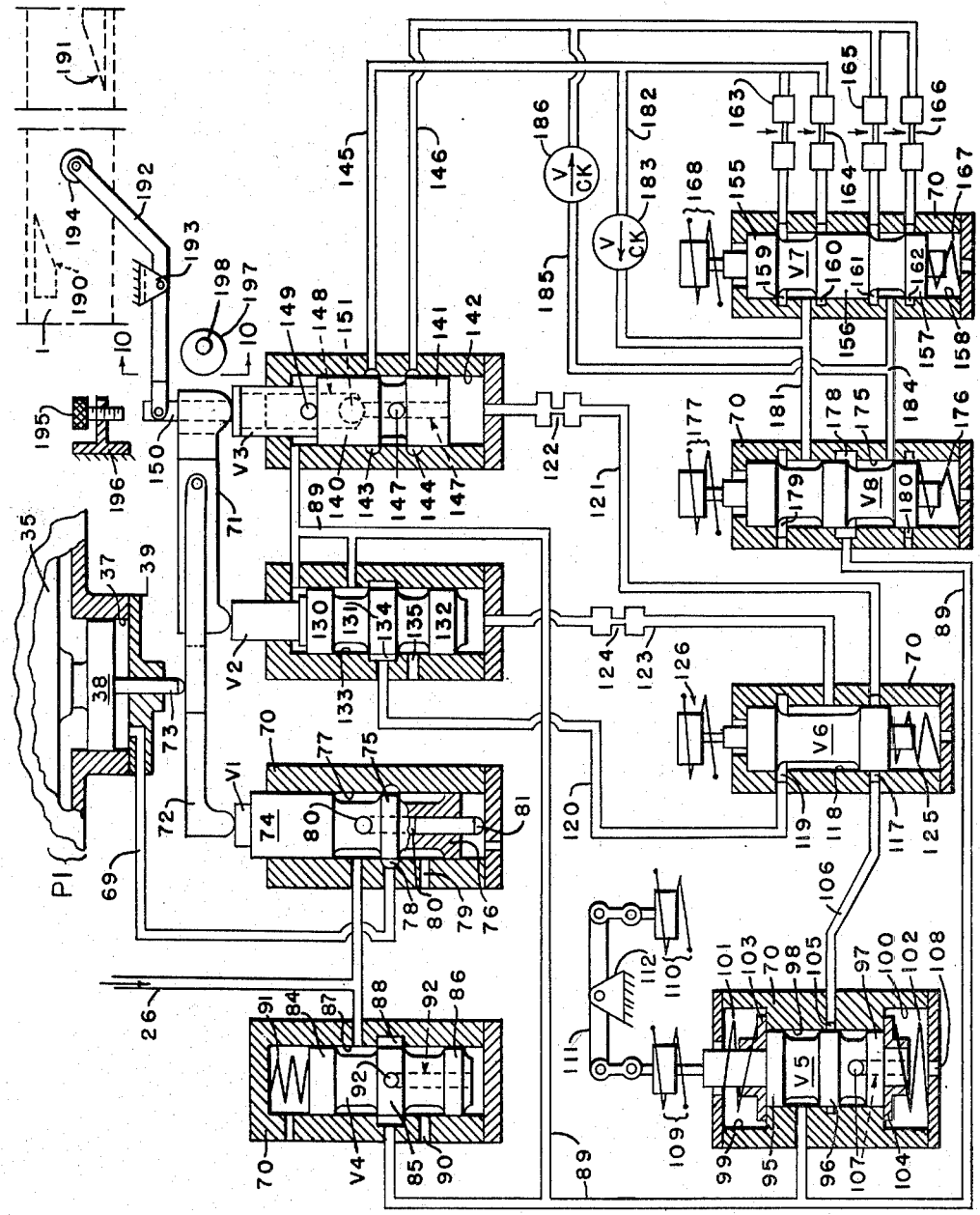
Fig. 5 is a diagram of the hydraulic circuit which controls the displacement varying mechanism of the pump shown in Figs. 1 and 4.

Solenoids 110, 109, 126, 177 and 168, which operate the valves shown in Fig. 5, have the opposite ends of their windings connected to lines L4 and L5 through the switches $a$ and $b$ of contactors C2, C3, C4, C5 and C6 respectively. That is, solenoid 110 has one end of its winding connected to one contact of switch $C2^a$, the other end of its winding connected to one contact of switch $C2^b$, and the other contact of switches $C2^a$ and $C2^b$ are connected to lines L4 and L5 respectively. The other four solenoids are similarly connected to lines L4 and L5 through switches $C3^a$ and $C3^b$, $C4^a$ and $C4^b$, $C5^a$ and $C5^b$ and $C6^a$ and $C6^b$ respectively.

Motor M2 has one of its terminals connected to line L4 and its other two terminals connected to line L5 through limit switches LS2 and LS3, respectively, and two pushbutton starting switches SS4 and SS5 each of which has been represented in Fig. 7 by a double acting pushbutton switch having an upper normally closed contact $a$ and a lower normally open contact $b$.

The arrangement is such that, when switch SS4 is depressed, it will establish a circuit (L4—M2—LS2—$SS5^a$—$SS4^b$—L5) to cause motor M2 to rotate shaft 198 and cam 197 (Fig. 7) in a direction to effect an increase in the displacement of pump P1. If switch SS4 is depressed for too long a time, cam 199 will open switch LS2 and stop motor M2 before cam 197 has been rotated beyond its maximum displacement position. When switch SS5 is depressed, it will establish a circuit (L4—M2—LS3—$SS5^b$—$SS4^a$—L5) to cause motor M2 to rotate shaft 198 and cam 197 in a direction to effect a decrease in the displacement of pump P1. If switch SS5 is depressed for too long a time, cam 199 will open switch LS3 and stop motor M2 before cam 197 has been rotated beyond its minimum displacement position. The reason for using double acting switches is to prevent motor M2 from being energized if the operator should depress both switches SS4 and SS5 at the same time.

Magnets $C2^m$ and $C3^m$ of contactor C2 and C3 have the winding of each connected at one end to line L4 and connected at the other end to branch line L6 through two double acting starting switches SS6 and SS7 each of which has a normally closed upper contact $a$ and a normally open lower contact $b$. Switches SS6 and SS7 preferably are double acting as shown to prevent both of magnets $C2^m$ and $C3^m$ from being energized at the same time.

The arrangement is such that depressing switch SS6 will establish a circuit ($L4-C2^m-SS7^a-SS6^b-L6$) to energize magnet $C2^m$ which will cause contactor C2 to close its switches and effect energization of solenoid 110 and depressing switch SS7 will establish a circuit ($L4-C3^m-SS7^b-SS6^a-L6$) to energize magnet $C3^m$ which will cause contactor C3 to close its switches and effect energization of solenoid 109.

Magnet $C4^m$ of contactor C4 has one end of its winding connected to line L4 and the other end of its winding connectable to line L6 through either switch $C2^c$ or switch $C3^c$ or through switch $C4^c$ and a manual switch S2 which selects between manual control and automatic operation of table 1. Switches $C2^c$, $C3^c$ and $C4^c$ are connected in parallel with each other and switch S2 is connected in series with switch $C4^c$.

The arrangement is such that, when contactor C2 or C3 is operated in response to switch SS6 or SS7 being depressed, the switch $C2^c$ or $C3^c$ thereof will establish a circuit through magnet $C4^m$ which will cause contactor C4 to close its switches. If selector switch S2 is open, contactor C4 will return to its normal position when the depressed switch SS6 or SS7 is released. But if selector switch S2 is closed, operation of contactor C4 will cause its switch $C4^c$ to establish a holding circuit to keep magnet $C4^m$ energized and contactor C4 operated when the depressed switch SS6 or SS7 is released.

Magnet $C5^m$ of contactor C5 has one end of its winding connected to line L4 and the other end of its winding connected to line L6 through switches $C2^d$, $C4^d$ and $C3^d$. When contactor C4 first operates and closes its switch $C4^d$, switch $C2^d$ or $C3^d$ is open so that magnet $C5^m$ of contactor C5 will not be energized until the depressed switch SS6 or SS7 is released and permits the operated contactor C2 or C3 to return to its normal position and close its switch $C2^d$ or $C3^d$ which will establish a circuit through magnet $C5^m$.

Magnet $C6^m$ of contactor C6 has one end of its winding connected to line L4 and the other end of its winding connected to line L5 through normally open limit switch LS1 so that contactor C6 will be operated whenever switch LS1 is closed in response to speed range selector valve 9 (Fig. 1) being shifted into its low speed range position or its intermediate speed range position.

OPERATION

Assuming that line switch S1 has been closed, that starting switch SS1 has been closed momentarily to cause motor starter C1 to close and start motor M1, that cam 197 (Fig. 5) has been adjusted to obtain the desired speed of table 1, that the displacement of pump P1 is zero and that selector valve 9 is in the position shown in Fig. 1, the drive will operate as follows:

Slow speed operation

If it is desired to start table 1 moving toward the right or in a "cut" direction, depressing starting switch SS6 (Fig. 7) will establish a circuit to energize magnet $C2^m$ which will cause switches $C2^a$, $C2^b$ and $C2^c$ to close and switch $C2^d$ to open. Closing switches $C2^a$ and $C2^b$ will establish a circuit to energize solenoid 110 which will raise directional valve V5 (Fig. 5). Opening switch $C2^d$ will prevent magnet $C5^m$ from being energized when switch $C4^d$ closes. Closing switch $C2^c$ will establish a circuit to energize magnet $C4^m$ which will cause switches $C4^a$, $C4^b$, $C4^c$ and $C4^d$ to close. Closing switches $C4^a$ and $C4^b$ will establish a circuit to energize solenoid 126 which will move valve V6 downward into the position shown in Fig. 6. Closing switch $C4^c$ will have no effect if selector switch S2 is open. Closing switch $C4^d$ will have no effect at this time because switch $C2^d$ is open.

Moving valve V5 upward and valve V6 downward destroys the pressures in the lower ends of bores 133 and 142 which permits liquid to flow from channel 89 into the upper ends of bores 133 and 142 and cause plungers V2 and V3 to move downward and to eject liquid from the lower ends of bores 133 and 142 through channels 123 and 121, respectively, into bore 118 and then through channel 106, bore 98, passage 107, chamber 100 and port 108 to exhaust. Plunger V2 will move downward to the limit of its movement at a rate determined by the limited rate at which it can eject liquid through the choke 124 in channel 123.

As soon as plunger V3 starts to move downward, it uncovers a very small portion of port 144 and then liquid will flow from channel 89 through bore 175, channels 184, 185 and 146, port 144, passage 147, the lower end of bore 142 and the previously described channels to exhaust but choke 122 will restrict the flow of liquid therethrough and cause creation in the lower end of bore 142 of a pressure which is sufficient to support plunger V3 and which is only about one-half the pressure in channel 89 because the area of the lower end of piston 141 is about twice the area of the upper end of piston 140. Plunger V3 will move downward so little that the effect of its movement upon the displacement of pump P1 will be negligible.

Movement of plunger V2 to its lower position permits the left end of teeter bar 71 and the right end of lever 72 to descend and thereby permit the pressure in bore 80 to move plunger V1 upward and connect servo-motor cylinder 37 to exhaust. Then the liquid continuously supplied to servo-motor cylinder 40 (Fig. 4) will cause piston 41 to move slideblock 35 in a direction to cause pump P1 to discharge liquid into channel 7. Rod 73 will move with slideblock 35 and will cause lever 72 to return plunger V1 to its neutral position and stop further movement of slideblock 35 when slideblock 35 has been moved a distance substantially proportional to the distance that plunger V2 is moved. At that time, pump P1 will be discharging liquid into channel 7 at a limited rate which will cause motor 2—6 to drive table 1 toward the right at a slow speed.

When starting switch SS6 (Fig. 7) is released), it will deenergize magnet $C2^m$ which will permit contactor C2 to open its switches $C2^a$, $C2^b$ and $C2^c$ and to close its switch $C2^d$. Opening switches $C2^a$ and $C2^b$ will deenergize solenoid 110 which will permit valve V5 to be returned to its neutral position by its spring 101. With selector switch S2 open, opening switch $C2^c$ will deenergize magnet $C4^m$ which will open its switches $C4^a$, $C4^b$, $C4^c$ and $C4^d$. Closing switch $C2^d$ has no effect because switch $C4^d$ is open. Opening switches $C4^a$ and $C4^b$ deenergizes solenoid 126 which permits valve V6 to be returned to its initial position by spring 125. Opening switches $C4^c$ and $C4^d$ has no effect at this time.

With valves V5 and V6 in their normal positions, no liquid can escape from the lower ends of bores 133 and 142. The liquid flowing from channel 146 through port 144 through passage 147 into the lower end of bore 142 will raise plunger V3 until piston 141 covers port 144 at which time plunger V3 will be in its normal position. At the same time, liquid will flow from channel 89 through bore 133, port 134, channel 120, bore 188 and channel 123 to the lower end of bore 133 and will raise plunger V2 at the rate determined by choke 124 until piston 131 covers port 134 at which time plunger V2 will be in its normal position.

The left end of teeter bar 71 and the right end of lever 72 will move upward with plunger V2 and cause lever 72 to pivot upon rod 73 and depress plunger V1. Then liquid will flow from channel 26 through bore 77, port 78 and channel 69 to cylinder 37 and cause piston 38 to move slideblock 35 toward its neutral position. Rod 73 will move with slideblock 35 and permit the left end of lever 72 to move upward with the right end thereof until the pressure in bore 80 has returned plunger V1 to its neutral position to stop further flow of liquid into cylinder 37 at which time slideblock 35 will be in its neutral position and movement of table 1 will cease.

If it is desired to start table 1 moving toward the left or in a "return" direction, depressing starting switch SS7 will establish a circuit to energize magnet $C3^m$ which will cause switches $C3^a$, $C3^b$ and $C3^c$ to close and switch C3$^d$ to open. Closing switches C3$^a$ and C3$^b$ will establish a circuit to energize solenoid 109 which will move directional valve V5 downward. Opening switch C3$^d$ will prevent magnet C5$^m$ from being energized when switch C4$^d$ closes. Closing switch C3$^c$ will establish a circuit to energize magnet C4$^m$ which will cause switches C4$^a$, C4$^b$, C4$^c$ and C4$^d$ to close. Closing switches C4$^a$ and C4$^b$ establishes a circuit to energize solenoid 126 which will move valve V6 downward into the position shown in Fig. 6. Closing switch C4$^c$ will have no effect if selector switch S2 is open. Closing switch C4$^d$ will have no effect at this time because switch C3$^d$ is open.

Moving valve V5 downward permits liquid to flow from channel 89 through bore 98, channel 106, port 117 and channel 121 to the lower end of bore 142 and raise plunger V3 until it uncovers just enough of port 143 to permit liquid to flow from the lower end of bore 142 through passage 147, port 143, channels 145, 182 and 181, bore 175 and port 179 to exhaust at the very limited rate at which the liquid can flow through choke 122. Plunger V3 is raised so little that its effect upon the displacement of pump P1 is negligible.

Figure 6:
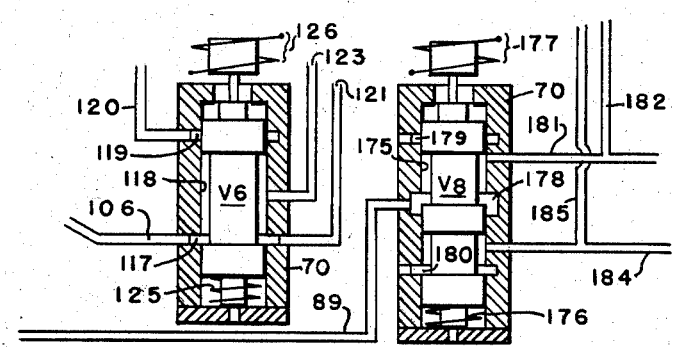
Fig. 6 is a view similar to the lower right hand portion of Fig. 5 but showing certain valves in positions different from those shown in Fig. 5.
Figure 9:
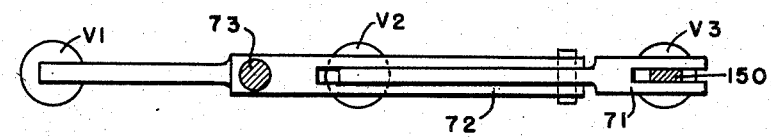
Fig. 9 is an enlarged plan view of a follow-up device shown in Fig. 5.

Moving valve V6 downward into the position shown in Fig. 6 permits liquid to flow from channel 106 through bore 118 and channel 123 into the lower end of bore 133 and move plunger V2 upward to the end of its stroke at a rate determined by the rate at which the liquid can flow through choke 124.

The left end of teeter bar 71 and the right end of lever 72 will move upward with plunger V2 and cause lever 72 to pivot upon rod 73 and depress plunger V1. Then liquid will flow from channel 26 through bore 77, port 78 and channel 69 to cylinder 37 and cause piston 38 to move slideblock 35 in a direction to cause pump P1 to discharge liquid into channel 8. Rod 73 will move with slideblock 35 and will cause lever 72 to return plunger V1 to its neutral position and stop further movement of slideblock 35 when slideblock 35 has been moved a distance substantially proportional to the distance that plunger V2 was moved. At that time pump P1 will be discharging liquid into channel 8 at a limited rate which will cause motor 2—6 to drive table 1 toward the left at a slow speed.

When starting switch SS7 is released, it will deenergize magnet C3$^m$ which will permit contact C3 to open its switches C3$^a$, C3$^b$ and C3$^c$ and to close its switch C3$^d$. Opening switches C3$^a$ and C3$^b$ will deenergize solenoid 109 which will permit valve V5 to be returned to its neutral position by spring 102. With selector switch S2 open, opening switch C3$^c$ will deenergize magnet C4$^m$ which will open its switches C4$^a$, C4$^b$, C4$^c$ and C4$^d$. Closing switch C3$^d$ will have no effect because switch C4$^d$ is open. Opening switches C4$^a$ and C4$^b$ will deenergize solenoid 126 which will permit valve V6 to be returned to its initial position by spring 125. Opening switches C4$^c$ and C4$^d$ has no effect at this time.

Returning valve V5 to its normal position cuts off flow of liquid to the lower end of bore 142 and permits the pressure in the upper end of bore 142 to cause plunger V3 to move downward and to eject liquid from the lower end of bore 142 through passage 147, port 143, channels 145, 182 and 181, bore 175 and port 179 to exhaust until piston 140 covers port 143 and traps the remaining liquid in the lower end of bore 142, thereby causing plunger V3 to stop in its neutral position. Thus, when valve V8 is in its normal position, plunger V3 will center itself regardless of the direction in which it has been moved away from center.

Returning valves V5 and V6 to their neutral position destroys the pressure in the lower end of bore 133 and permits the pressure in the upper end of bore 133 to cause plunger V2 to move downward and to eject liquid from the lower end of bore 133 through channel 123, bore 118, channel 120 and ports 134 and 135 to exhaust until piston 131 blocks port 134 at which time plunger V2 is in its neutral position.

Downward movement of plunger V2 permits the left end of teeter bar 71 and the right end of lever 72 to descend and thereby permit the pressure in bore 80 to move plunger V1 upward and connect servo-motor cylinder 37 to exhaust. Then the liquid continuously supplied to cylinder 40 will cause piston 41 to move slideblock 35 toward its neutral position. Rod 73 will move with slideblock 35 and will return plunger V2 to its neutral position and stop further movement of slideblock 35 substantially as soon as movement of plunger V2 ceases at which time slideblock 35 will be in its neutral position as movement of table 1 will cease.

*Automatic operation*

When it is desired that table 1 shall reciprocate continuously until stopped by the operator, selector switch S2 is closed. Table 1 may be started moving in either direction by depressing starting switch SS5 or SS6 to effect operation of contactor C2 or C3 and thereby cause contactor C4 to close its switches C4$^a$, C4$^b$, C4$^c$ and C4$^d$ as explained above.

Closing switches C4$^a$ and C4$^b$ will establish a circuit to energize solenoid 126 which will move valve V6 downward into the position shown in Fig. 6. With switch S2 closed, closing switch C4$^c$ will establish a holding circuit through magnet C4$^m$. Closing switch C4$^b$ will close one gap in the circuit through magnet C5$^m$ of contactor C5. Table 1 will move at slow speed as long as the starting switch is held down as explained above.

When the depressed starting switch is released, it will deenergize magnet C2$^m$ or C3$^m$ and cause the operated contactor C2 or C3 to return to its normal position and permit valve V5 to return to its normal position as explained above. But the return of contactor C2 or C3 to its normal position does not cause contactor C4 to return to its normal position because it is held in operated position by the holding circuit (L4—C4$^m$—S2—C4$^c$—L6). As contactor C2 or C3 returns to its normal position, its switch C2$^d$ or C3$^d$ establishes a circuit (L4—C5$^m$—C2$^d$—C4$^d$—C3$^d$—L6)

to energize magnet C5$^m$ and cause contactor C5 to close its switches. Closing switches C5$^a$ and C5$^b$ established a circuit to energize solenoid 177 which will shift valve V8 into the position shown in Fig. 6.

If valve V8 is shifted downward when pump P1 is discharging liquid into channel 8 and causing motor 2—6 to move table 1 toward the left at a slow speed, plunger V2 will be in its upper position and plunger V3 will be slightly above its neutral position so that port 143 is slightly uncovered. Shifting valve V8 will cause liquid to flow from channel 89 past valve V8 and through channel 181, port 159, choke 163, channel 145, port 143 and passage 147 into the lower end of bore 142 and move plunger V3 upward at a rate determined by the rate at which the liquid can flow through choke 163.

Plunger V3 will raise the right end of teeter bar 71 and cause lever 72 to pivot upon rod 73 and move plunger V1 downward to permit liquid to flow from channel 26 through bore 77 and channel 29 to cylinder 37 and move piston 38 and slideblock 35 in a direction to cause pump P1 to increase the rate at which it discharges liquid into channel 8 until stem 150 engages stop 195 at which time movement of slideblock 35 will cease, as previously explained, and pump P1 will be discharging liquid into channel 8 at the rate required to enable motor 2—6 to move table 1 at a speed determined by the adjustment of stop 195.

If valve V8 is shifted downward when pump P1 is discharging liquid into channel 7 and causing motor 2—6 to move table 1 toward the right at slow speed, plunger V2 will be in its lower position and plunger V3 will be slightly below its neutral position so that port 144 is slightly uncovered. Shifting valve V8 will connect the lower end of bore 142 to exhaust and permit liquid to flow from channel 189 into the upper end of bore 142 and cause plunger V3 to move downward and to eject liquid from the lower end of bore 142 through passage 147, port 144, channel 146, choke 165, port 161, channel 184 and port 182 to exhaust. Plunger V3 will move downward at a rate determined by the rate at which the liquid can flow through choke 165.

Downward movement of plunger V3 will permit the pressure in bore 80 to raise plunger V1 which will connect cylinder 37 to exhaust and permit servo-motor 40—41 to move slideblock 35 in a direction to cause pump P1 to increase the rate at which it discharges liquid into channel 7 until lever 192 engages stop 197 at which time movement of slideblock 35 will cease, as previously explained and pump P1 will be discharging liquid into channel 7 at the rate required to enable motor 2—6 to move table 1 at a speed determined by the adjustment of stop 197.

Table 1 will move toward the right at the speed determined by the adjustment of cam 197 until dog 190 engages roller 194 and causes lever 192 to gradually raise plunger V3 which will raise the right end of teeter bar 71 and cause lever 72 to move plunger V1 downward which will permit liquid to flow to cylinder 37 and cause piston 38 to move slideblock 35 upward in respect to Fig. 5, thereby reducing the displacement of pump P1 and decelerating table 1.

Dog 190 will cause lever 192 to raise plunger V3 until piston 140 uncovers a small portion of port 143, at which time slideblock 35 will be approximately in its neutral position and the speed of table 1 will be approximately zero, and then liquid will flow from channel 89 through bore 175, channel 181, port 159, choke 163, channel 145, port 143 and passage 147 into the lower end of bore 142 and will move plunger V3 upward at a rate proportional to the rate at which the liquid can flow through choke 163. At the same time, liquid will flow from the lower end of bore 142 through channel 121, bore 118 and channel 123 into the lower end of bore 133 and move plunger V2 into its upper position.

Upward movement of plunger V2 and continued upward movement of plunger V3 will cause slideblock 35 to continue to move upward in respect to Fig. 5 until upward movement of plunger V3 is stopped by stem 150 engaging stop 195. Movement of slideblock 35 above its neutral position will cause pump P1 to discharge liquid through channel 8 to motor 2–6 which will move table 1 toward the left. The maximum speed of table 1 is determined by the adjustment of stop 195 and the rate at which it is accelerated is determined by the rate at which liquid can flow through choke 163.

Table 1 will move toward the left at the speed determined by the adjustment of stop 195 until dog 191 engages roller 194 and causes lever 192 to gradually lower plunger V3 which will permit the right ends of teeter bar 71 and lever 72 to move downward and permit the pressure in bore 80 to raise plunger V1 to connect cylinder 37 to exhaust and permit servo-motor 40—41 to move slideblock 35 downward in respect to Fig. 5, thereby reducing the displacement of pump P1 and decelerating table 1.

Dog 191 will cause lever 192 to lower plunger V3 until piston 141 uncovers a small portion of port 144, at which time slideblock 35 will be approximately in its neutral position and the speed of table 1 will be approximately zero, and then liquid will flow from channel 89 into the upper ends of bores 133 and 142 and cause plungers V2 and V3 to move downward. Plunger V2 will move into its lower position and will eject liquid from the lower end of bore 133 through channel 123, bore 118 and channel 121 into the lower end of bore 142. Plunger V3 in moving downward will eject liquid from the lower end of bore 142 through passage 147, port 144, channel 146, choke 165, port 161, channel 184 and port 180 to exhaust. The rate at which plunger V3 moves downward is proportional to the rate at which it can eject liquid through choke 165.

Downward movement of plunger V2 and continued downward movement of plunger V3 will cause slideblock 35 to move downward in respect to Fig. 5 until downward movement of plunger V3 is stopped by lever 192 engaging cam 197. Movement of slideblock 35 below its neutral position will cause pump P1 to discharge liquid through channel 7 to motor 2—6 which will move table 1 toward the right. The maximum speed of table 1 is determined by the adjustment of cam 197 and the rate it is accelerated is determined by the rate at which liquid can flow through choke 165.

Table 1 will move toward the right until reversal is effected by dog 190 engaging roller 194, as explained above, and it will continue to reciprocate until the operator stops table 1 such as by opening stop switch SS3. In order that the work may readily be inspected, table 1 may be moved beyond its normal point of reversal at the end of a return stroke by depressing switch SS7 to energize magnet C3m which will close switches C3a, C3b and C3c and open switch C3d. Opening switch C3d deenergizes magnet C5m to permit switches C5a and C5b to open and deenergize solenoid 177 which will permit valve V8 to return to its normal position and cause plunger V3 to center itself as previously explained.

Closing switches C3a and C3b energizes solenoid 109 which will move valve V5 downward to permit pressure to extend into the lower end of bore 133 to hold valve V2 in its upper position. Then table 1 will move toward the left at slow speed until stopped by opening switch SS3. Thereafter, operation may be resumed by depressing switch SS6 which will start table 1 moving toward the right as previously explained.

The hydraulic drive herein set forth is susceptible of various modifications and adaptations without departing from the scope of the invention which is hereby claimed as follows:

1. A hydraulic system comprising a hydraulic motor for driving a load in opposite directions alternately, a pump for supplying liquid to said motor to energize the same, fluid channels connecting said pump to said motor and forming therewith a closed hydraulic circuit having interchangeable pressure and return sides, said pump having a displacement varying member normally occupying a neutral position in which pump displacement is zero and shiftable in opposite directions to cause said pump to discharge liquid into one or the other side of said circuit and thereby enable said motor to drive said load in one direction or the other, a relief valve, means for providing communication between the return side of said circuit and said relief valve including a locking valve normally occupying an open position and adapted to close and block said communication in response to movement of said member, and means responsive to movement of said member ceasing for opening said locking valve to re-establish said communication.

2. A hydraulic system comprising a hydraulic motor for driving a load in opposite directions alternately, a pump for supplying liquid to said motor to energize the same, fluid channels connecting said pump to said motor and forming therewith a closed hydraulic circuit having interchangeable pressure and return sides, said pump having a displacement varying member normally occupying a neutral position in which pump displacement is zero and shiftable in opposite directions to cause said pump to discharge liquid into one or the other side of said circuit and thereby enable said motor to drive said load in one direction or the other, servo-motor means for shifting said member and including at least one piston and cylinder, means for supplying liquid to said servo-motor means to cause the same to move said member in opposite directions alternatively, a relief valve, means for providing communication between the return side of said circuit and said relief valve including a locking valve normally occupying an open position and adapted to close and block said communication in response to movement of said piston, and means responsive to movement of said piston ceasing for opening said locking valve to re-establish said communication.

3. A hydraulic system comprising a hydraulic motor for driving a load in opposite directions alternately, a pump for supplying liquid to said motor to energize the same, fluid channels connecting said pump to said motor and forming therewith a closed hydraulic circuit having interchangeable pressure and return sides, said pump having a displacement varying member normally occupying a neutral position in which pump displacement is zero and shiftable in opposite directions to cause said pump to discharge liquid into one or the other side of said circuit and thereby enable said motor to drive said load in one direction or the other, servo-motor means for shifting said member and including at least one piston and cylinder, means for supplying liquid to said servo-motor means to cause the same to move said member in opposite directions alternatively, a relief valve, means for providing communication between the return side of said circuit and said relief valve including a locking valve normally occupying an open position and adapted to close and block said communication in response to flow of liquid into or out of said cylinder, and means responsive to liquid ceasing to flow into or out of said cylinder for opening said locking valve to re-establish said communication.

4. A hydraulic system comprising a hydraulic motor for driving a load in opposite directions alternately, a pump for supplying liquid to said motor to energize the same, fluid channels connecting said pump to said motor and forming therewith a closed hydraulic circuit having interchangeable pressure and return sides, said pump having a displacement varying member normally occupying a neutral position in which pump displacement is zero and shiftable in opposite directions to cause said pump to discharge liquid into one or the other side of said circuit and thereby enable said motor to drive said load in one direction or the other, means for creating back pressure in the return side of said circuit including an auxiliary pump and a relief valve for limiting the pressure created by said auxiliary pump, means for providing communication between the return side of said circuit and said auxiliary pump and said relief valve including a locking valve normally occupying an open position and adapted to close and block said communication in response to movement of said member, and means responsive to movement of said member ceasing for opening said locking valve to re-establish said communication.

5. A hydraulic system comprising a hydraulic motor for driving a load in opposite directions alternately, a pump for supplying liquid to said motor to energize the same, fluid channels connecting said pump to said motor and forming therewith a closed hydraulic circuit having interchangeable pressure and return sides, said pump having a displacement varying member normally occupying a neutral position in which pump displacement is zero and shiftable in opposite directions to cause said pump to discharge liquid into one or the other side of said circuit and thereby enable said motor to drive said load in one direction or the other, servo-motor means for shifting said member and including at least one piston and cylinder, means for supplying liquid to said servo-motor means to cause the same to move said member in opposite directions alternatively, means for creating back pressure in the return side of said circuit including an auxiliary pump and a relief valve for limiting the pressure created by said auxiliary pump, means for providing communication between the return side of said circuit and said auxiliary pump and said relief valve including a locking valve normally occupying an open position and adapted to close and block said communication in response to flow of liquid into or out of said cylinder, and means responsive to liquid ceasing to flow into or out of said cylinder for opening said locking valve to re-establish said communication.

6. A hydraulic system comprising a hydraulic motor for driving a load in opposite directions alternately, a pump for supplying liquid to said motor to energize the same, fluid channels connecting said pump to said motor and forming therewith a closed hydraulic circuit having interchangeable pressure and return sides, said pump having a displacement varying member normally occupying a neutral position in which pump displacement is zero and shiftable in opposite directions to cause said pump to discharge liquid into one or the other side of said circuit and thereby enable said motor to drive said load in one direction or the other, a large servo-motor for moving said member in one direction, a small servo-motor for moving said member in the opposite direction and including a piston and a cylinder, a valve body closing the outer end of said cylinder and having a bore formed therein with four ports formed in the wall thereof, fluid channel means for connecting the first of said ports to a source of pressure liquid, fluid channel means for connecting the second of said ports to the return side of said circuit, a fluid channel connecting the third of said ports to said cylinder, a spring-centered locking valve arranged in said bore to control said ports and having its inner end subjected to the pressure in said cylinder, said valve normally occupying a position in which said second port is open to said first port and being shiftable in one direction or the other to block one or the other of said first and second ports, a source of pressure liquid, means for supplying liquid from said source to the fourth of said ports and to the outer end of said locking valve to thereby maintain in said cylinder the same pressure that prevails at said source, and means including a pilot valve for connecting said large servo-motor to said source and to exhaust selectively.

7. A hydraulic system comprising a hydraulic motor for driving a load in opposite directions alternately, a pump for supplying liquid to said motor to energize the same, fluid channels connecting said pump to said motor and forming therewith a closed hydraulic circuit having interchangeable pressure and return sides, said pump having a displacement varying member normally occupying a neutral position in which pump displacement is zero and shiftable in opposite directions to cause said pump to discharge liquid into one or the other side of said circuit and thereby enable said motor to drive said load in one direction or the other, an auxiliary pump for maintaining pressure in both sides of said circuit only when said member is in its neutral position, a relief valve for limiting the pressure created by said auxiliary pump, and means for connecting said auxiliary pump and said relief valve to both sides of said circuit including a blocking valve responsive to movement of said member away from its neutral position for blocking communication between said relief valve and the side of said circuit which is the pressure side.

8. A hydraulic system comprising a hydraulic motor for driving a load in opposite directions alternately, a pump for supplying liquid to said motor to energize the same, fluid channels connecting said pump to said motor and forming therewith a closed hydraulic circuit having interchangeable pressure and return sides, said pump having a displacement varying member normally occupying a neutral position in which pump displacement is zero and shiftable in opposite directions to cause said pump to discharge liquid into one or the other side of said circuit and thereby enable said motor to drive said load in one direction or the other, a large servo-motor for moving said member in one direction, a small servo-motor for moving said member in the opposite direction and including a piston and a cylinder, means for effecting operation of said servo-motors to cause the same to move said member in opposite directions selectively, a valve body closing the outer end of said cylinder and having a bore formed therein with a center port and two end ports formed in the wall thereof, an auxiliary pump for maintaining pressure in both sides of said circuit only when said member is in its neutral position, a relief valve for limiting the pressure created by said auxiliary pump, means for connecting said center port to said auxiliary pump, channels connecting said two end ports to the two sides of said circuit respectively, and a blocking valve fitted in said bore and movable with said piston into a position to block communication between said center port and one of said end ports in response to movement of said piston in one direction and movable into a position to block communication between said center port and the other of said end ports in response to movement of said piston in the opposite direction.

9. A hydraulic system comprising a hydraulic motor for driving a load in opposite directions alternately, a pump for supplying liquid to said motor to energize the same, fluid channels connecting said pump to said motor and forming therewith a closed hydraulic circuit having interchangeable pressure and return sides, said pump having a displacement varying member normally occupying a neutral position in which pump displacement is zero and shiftable in opposite directions to cause said pump to discharge liquid into one or the other side of said circuit and thereby enable said motor to drive said load in one direction or the other, an auxiliary pump for maintaining pressure in both sides of said circuit only when said member is in its neutral position, a relief valve for limiting the pressure created by said auxiliary pump, means for connecting said auxiliary pump and said relief valve to both sides of said circuit including a blocking valve responsive to movement of said member away from its neutral position for blocking communication between said relief valve and the side of said circuit which is the pressure side, a locking valve arranged between said blocking valve and said auxiliary pump and said relief valve, said locking valve normally being open to provide communication between said circuit and said auxiliary pump and said relief valve and being adapted to close and block said communication in response to movement of said member, and means responsive to movement of said member ceasing for opening said locking valve to re-establish said communication.

10. A hydraulic system comprising a hydraulic motor for driving a load in opposite directions alternately, a pump for supplying liquid to said motor to energize the same, fluid channels connecting said pump to said motor and forming therewith a closed hydraulic circuit having interchangeable pressure and return sides, said pump having a displacement varying member normally occupying a neutral position in which pump displacement is zero and shiftable in opposite directions to cause said pump to discharge liquid into one or the other side of said circuit and thereby enable said motor to drive said load in one direction or the other, servo-motor means for shifting said member and including at least one piston and cylinder, means for supplying liquid to said servo-motor means to cause the same to move said member in opposite directions alternatively, an auxiliary pump for maintaining pressure in both sides of said circuit only when said member is in its neutral position, a relief valve for limiting the pressure created by said auxiliary pump, means for connecting said auxiliary pump and said relief valve to both sides of said circuit including a blocking valve responsive to movement of said member away from its neutral position for blocking communication between said relief valve and the side of said circuit which is the pressure side, a locking valve arranged between said blocking valve and said auxiliary pump and said relief valve, said locking valve normally being open to provide communication between said circuit and auxiliary pump and said relief valve and being adapted to close and block said communication in response to movement of said piston, and means responsive to movement of said piston ceasing for opening said locking valve to re-establish said communication.

11. A hydraulic system comprising a hydraulic motor for driving a load in opposite directions alternately, a pump for supplying liquid to said motor to energize the same, fluid channels connecting said pump to said motor and forming therewith a closed hydraulic circuit having interchangeable pressure and return sides, said pump having a displacement varying member normally occupying a neutral position in which pump displacement is zero and shiftable in opposite directions to cause said pump to discharge liquid into one or the other side of said circuit and thereby enable said motor to drive said load in one direction or the other, servo-motor means for shifting said member and including at least one piston and cylinder, means for supplying liquid to said servo-motor means to cause the same to move said member in opposite directions alternatively, an auxiliary pump for maintaining pressure in both sides of said circuit only when said member is in its neutral position, a relief valve for limiting the pressure created by said auxiliary pump, means for connecting said auxiliary pump and said relief valve to both sides of said circuit including a blocking valve responsive to movement of said member away from its neutral position for blocking communication between said relief valve and the side of said circuit which is the pressure side, a locking valve arranged between said blocking valve and said auxiliary pump and said relief valve, said locking valve normally being open to provide communication between said circuit and said auxiliary pump and said relief valve and being adapted to close and block said communication in response to flow of liquid into or out of said cylinder, means responsive to liquid ceasing to flow into or out of said cylinder for opening said locking valve to re-establish said communication.

12. A hydraulic system according to claim 6 in which said valve body has formed therein a second bore having a center port and two end ports formed in the wall thereof, said center port is connected to said second port and said two end ports are connected to the two sides of said circuit respectively, and which includes a blocking valve fitted in said second bore and movable with said piston into a position to block communication between said center port and one of said end ports in response to movement of said piston in one direction and movable into a position to block communication between said center port and the other of said end ports in response to movement of said piston in the opposite direction.

13. In a hydraulic system having a hydraulic motor for driving a load in opposite directions alternately, a pump for supplying liquid to said motor to energize the same, fluid channels connecting said pump to said motor and forming therewith a closed hydraulic circuit having interchangeable pressure and return sides, said pump having a displacement varying member normally occupying a neutral position in which pump displacement is zero and shiftable in opposite directions to cause said pump to discharge liquid into one or the other side of said circuit and thereby enable said motor to drive said load in one direction or the other, and servo-motor means for shifting said member in one direction or the other, the combination of means for supplying pressure liquid to said servo-motor means to energize the same and including a pilot valve for controlling the flow of liquid to and from said servo-motor means, said pilot valve normally occupying a neutral position in which it cuts off flow of liquid to or from said servo-motor means and being shiftable in one direction or the other from said neutral position to direct liquid to or from said servo-motor means to thereby cause said servo-motor means to move said member in one direction or the other, a plunger normally occupying a neutral position and being shiftable in one direction or the other to effect movement of said pilot valve in one direction or the other, means for supplying pressure liquid to said plunger to effect operation thereof, a second valve for controlling operation of said plunger, and a follow-up mechanism responsive to movement of said plunger for effecting movement of said pilot valve away from its neutral position and responsive to movement of said member for effecting movement of said pilot valve toward its neutral position.

14. A combination as set forth in claim 13 and including a first cylinder having a center port and an exhaust port below said center port, said plunger being fitted in said cylinder and normally occupying a neutral position in which it covers said center port, said plunger having a pressure area on its lower end and a smaller pressure area on its upper end, a second cylinder having a first port and a second port, a first channel connecting said center port to said first port, a second channel connecting the lower end of said first cylinder to said second cylinder at a point between said first and second ports, said second valve being fitted in said second cylinder and normally occupying a first position in which it blocks said second port and permits communication between said second channel and said first port, a source of low pressure liquid, and channel means connecting said source to said first cylinder at the upper end thereof and at a point above said center port so that uncovering said center port due to said plunger moving away from its neutral position will cause liquid to flow to or from the lower end of said first cylinder and cause said plunger to be returned to its neutral position.

15. A combination as set forth in claim 14 and including means for connecting said second port to said source or to exhaust alternatively, and means for shifting said second valve into a second position in which it blocks said first port and establishes communication between said second port and said second channel to thereby effect movement of said plunger in one direction in response to said second port being connected to said source and to effect movement of said plunger in the opposite direction in response to said second port being connected to exhaust.

16. A combination as set forth in claim 15 and in which said connecting means includes a directional valve normally occupying a neutral position and shiftable either into a first operative position in which it connects said second port to a source of pressure liquid or into a second operative position in which it connects said second port to exhaust, and which includes a first solenoid for shifting said directional valve into its first operative position, a second solenoid for shifting said directional valve into its second operative position, a third solenoid for shifting said second valve into its second position, and means for energizing said third solenoid in response to either said first or said second solenoid being energized.

17. A combination as set forth in claim 13 and including a first cylinder having a first port and a second port formed in the wall thereof and spaced from each other, two pistons formed upon said plunger and fitted in said cylinder and spaced apart a distance substantially equal to the distance between the adjacent edges of said ports, said plunger normally occupying a neutral position in which said pistons cover said ports and having a stem extending through the upper end of said cylinder, a source of pressure liquid, channel means connecting the upper end of said cylinder to said source, means including a control valve for connecting each of said ports to said source or to exhaust alternatively, said control valve normally occupying a first position in which it connects said first port to exhaust and said second port to pressure so that uncovering either one or the other of said ports due to said plunger moving away from its neutral position will cause liquid to flow to or from the lower end of said first cylinder and cause said plunger to return to its neutral position, and means for shifting said control valve into a second position in which it connects said first port to pressure and said second port to exhaust so that movement of said plunger away from its neutral position in either direction will cause liquid to flow to or from the lower end of said cylinder and cause said plunger to move to the limit of its movement in the same direction.

18. A combination as set forth in claim 17 including a high speed choke connected between said control valve and each of said ports, a low speed choke connected in parallel with each of said high speed chokes, and an acceleration selector valve connected between said chokes and said control valve for blocking communication between said control valve and either said low speed chokes or said high speed chokes.

19. In a hydraulic system having a hydraulic motor for driving a load in opposite directions alternately, a pump for supplying liquid to said motor to energize the same, fluid channels connecting said pump to said motor and forming therewith a closed hydraulic circuit having interchangeable pressure and return sides, said pump having a displacement varying member normally occupying a neutral position in which pump displacement is zero and shiftable in opposite directions to cause said pump to discharge liquid into one or the other side of said circuit and thereby enable said motor to drive said load in one direction or the other, and servo-motor means for shifting said member in one direction or the other, the combination of means for supplying pressure liquid to said servo-motor means to energize the same and including a pilot valve for controlling the flow of liquid to and from said servo-motor means, said pilot valve normally occupying a neutral position in which it cuts off flow of liquid to or from said servo-motor means and being shiftable in one direction or the other from said neutral position to direct liquid to or from said servo-motor means to thereby cause said servo-motor means to move said member in one direction or the other, a slow speed plunger and a reversing plunger each normally occupying a neutral position and being shiftable in one direction or the other to effect movement of said pilot valve in one direction or the other, a follow-up mechanism responsive to movement of one or both of said plungers for effecting movement of said pilot valve away from its neutral position and responsive to movement of said member for effecting movement of said pilot valve toward its neutral position, means for initially shifting said slow speed plunger to the limit of its movement in one direction or the other, and means for thereafter shifting said reversing plunger to the limit of its movement in a direction corresponding to the direction in which said slow speed plunger was shifted.

20. A combination as set forth in claim 19 and including means responsive to said load approaching the limit of its movement in one direction or the other for shifting said reversing plunger to a point beyond its neutral position from the position to which it was previously moved, means responsive to said reversing plunger reaching said point for continuing the movement of said reversing plunger to the limit of its movement, and means responsive to said reversing plunger reaching said point for shifting said slow speed plunger to the limit of its movement in a direction corresponding to the direction in which said reversing plunger was just moved.

21. In a hydraulic system having a hydraulic motor for driving a load in opposite directions alternately, a pump for supplying liquid to said motor to energize the same, fluid channels connecting said pump to said motor and forming therewith a closed hydraulic circuit having interchangeable pressure and return sides, said pump having a displacement varying member normally occupying a neutral position in which pump displacement is zero and shiftable in opposite directions to cause said pump to discharge liquid into one or the other side of said circuit and thereby enable said motor to drive said load in one direction or the other, and servo-motor means for shifting said member in one direction or the other, the combination of means for supplying pressure liquid to said servo-motor means to energize the same and including a pilot valve for controlling the flow of liquid to and from said servo-motor means, said pilot valve normally occupying a neutral position in which it cuts off flow of liquid to or from said servo-motor means and being shiftable in one direction or the other from said neutral position to direct liquid to or from said servo-motor means to thereby cause said servo-motor means to move said member in one direction or the other, a slow speed plunger and a reversing plunger each normally occupying a neutral position and being shiftable in one direction or the other to effect movement of said pilot valve in one direction or the other, a follow-up mechanism responsive to movement of one or both of said plungers for effecting movement of said pilot valve away from its neutral position and responsive to movement of said member for effecting movement of said pilot valve toward its neutral position, means including a low speed valve for initially shifting said low speed plunger to the limit of its movement in one direction or the other and for initially shifting said reversing plunger away from its neutral position in a direction corresponding to the direction in which said low speed plunger was moved, means including a high speed valve for shifting said reversing plunger to the limit of its movement in response to it being moved away from its neutral position, means responsive to said load approaching the limit of its movement in one direction or the other for shifting said reversing plunger to a point beyond its neutral position from the position to which it was previously moved, and means responsive to said reversing plunger reaching said point for shifting said slow speed plunger to the limit of its movement in a direction corresponding to the direction in which said reversing plunger was just moved.

22. A combination as set forth in claim 21 in which said means for initially shifting said low speed plunger includes a starting valve to cooperate with said low speed valve and effect initial movement of said low speed plunger, a first solenoid for shifting said starting valve, a second solenoid for shifting said low speed valve, a third solenoid for shifting said high speed valve, and an electric circuit including a starting switch, means responsive to closing said starting switch for energizing said first and said second solenoids, means responsive to opening said starting switch for deenergizing said first solenoid and energizing said third solenoid, and means responsive to said starting switch being closed after said third solenoid is energized for deenergizing said third solenoid.

References Cited in the file of this patent

UNITED STATES PATENTS

| | | |
|---|---|---|
| 2,227,814 | Tyler | Jan. 7, 1941 |
| 2,240,898 | Wiedmann | May 6, 1941 |
| 2,465,212 | Douglas | Mar. 22, 1949 |
| 2,497,608 | Herrstrum et al. | Feb. 14, 1950 |